(12) United States Patent
Lun

(10) Patent No.: US 7,828,126 B2
(45) Date of Patent: Nov. 9, 2010

(54) MAGNETORHEOLOGICAL (MR) PISTON, MR PISTON ASSEMBLY, AND MR DAMPER SYSTEM

(75) Inventor: Saiman Lun, Centerville, OH (US)

(73) Assignee: BWI Company Limited S.A., Luxembourg (LU)

(*) Notice: Subject to any disclaimer, the term of this patent is extended or adjusted under 35 U.S.C. 154(b) by 477 days.

(21) Appl. No.: 11/900,825

(22) Filed: Sep. 13, 2007

(65) Prior Publication Data

US 2009/0071773 A1   Mar. 19, 2009

(51) Int. Cl.
F16F 9/53   (2006.01)

(52) U.S. Cl. .................................. 188/267.2

(58) Field of Classification Search ............ 188/267, 188/267.1, 267.2, 266.2, 266.7, 283, 322.15, 188/322.22
See application file for complete search history.

(56) References Cited

U.S. PATENT DOCUMENTS

| | | | |
|---|---|---|---|
| 5,161,653 A * | 11/1992 | Hare, Sr. | 188/267.1 |
| 5,690,195 A | 11/1997 | Kruckemeyer et al. | |
| 6,390,252 B1 * | 5/2002 | Namuduri et al. | 188/267.2 |
| 6,419,057 B1 | 7/2002 | Oliver et al. | |
| 6,637,560 B2 * | 10/2003 | Oliver et al. | 188/322.19 |
| 6,874,603 B2 * | 4/2005 | Lisenker et al. | 188/267.2 |

* cited by examiner

Primary Examiner—Melanie Torres Williams
(74) Attorney, Agent, or Firm—Dickinson Wright PLLC (57) ABSTRACT

A magnetorheological (MR) piston assembly (10) includes an MR piston (12) and a rod (14). The MR piston (12) includes a central longitudinal axis (16), first and second longitudinal ends (18 and 20), an MR passageway (22), a main electric coil (24), and a valve (26). The MR passageway (22) extends from the first longitudinal end (18) to the second longitudinal end (20). The main electric coil (24) is disposed to magnetically energize the MR passageway (22). The valve (26) is operatively connected to the MR passageway (22). The valve (26) has a first state when electrically activated which is less restrictive of the MR passageway (22) and has a second state when not electrically activated which is more restrictive of the MR passageway (22). The rod (14) is attached to the MR piston (12). A more detailed MR piston (12) and an MR damper system (60) are also described.

20 Claims, 5 Drawing Sheets

MAGNETORHEOLOGICAL (MR) PISTON, MR PISTON ASSEMBLY, AND MR DAMPER SYSTEM

TECHNICAL FIELD

The present invention relates generally to piston dampers, and more particularly to a magnetorheological (MR) piston, to an MR piston assembly, and to an MR damper system.

BACKGROUND OF THE INVENTION

Conventional piston dampers include MR dampers having a tube containing an MR fluid and having an MR piston assembly including a piston which slideably engages the tube and including a rod which has a first end attached to the piston and a second end extending outside the tube. The MR fluid passes through an MR passageway (i.e., a magnetically energizable passageway) of the MR piston. Exposing the MR fluid in the MR passageway to a varying magnetic field, generated by providing a varying electric current from a controller to an electric coil of the MR piston, varies the damping effect of the MR fluid in the MR passageway providing variably-controlled damping of relative motion between the MR piston and the tube. The electric current is varied (including turning off the electric current) to accommodate varying operating conditions, as is known to those skilled in the art. The tube and the rod are attached to separate structures to dampen relative motion of the two structures along the direction of piston travel. In one known application, the MR damper is employed as a vehicle suspension damper to control vehicle ride and handling including damping during jounce and rebound. The controller of the MR damper system limits the vehicle's top speed should there be a power failure to the damper since such power failure would result in soft damping which would decrease vehicle maneuverability at high vehicle speeds.

A known design includes an MR piston having an MR piston core, two MR piston end plates, and an MR piston ring. The MR piston core is disposed longitudinally between and attached to the two MR piston end plates. The MR piston ring is attached to the MR piston end plates and is radially-outwardly spaced apart from the MR piston core to define an MR passageway portion between the MR piston core and the MR piston ring. An MR passageway is a magnetically energizable passageway. An electric coil is located in the MR piston core to magnetically energize MR fluid in the MR passageway. The MR passageway also includes a portion which extends through each of the two MR piston end plates. The MR piston core may include an MR bypass passageway (i.e., a magnetically non-energizable passageway) radially inward of the MR passageway and the electric coil. The MR bypass passageway also likewise includes a portion which extends through each of the two MR piston end plates. The outer circumference of the MR piston ring slidingly engages the inner circumference of the tube of the MR damper.

What is needed is an improved MR piston, MR piston assembly, and MR damper system.

SUMMARY OF THE INVENTION

A first expression of an embodiment of the invention is for a magnetorheological (MR) piston assembly including an MR piston and a rod. The MR piston includes a central longitudinal axis, first and second longitudinal ends, an MR passageway, a main electric coil, and a valve. The MR passageway extends from the first longitudinal end to the second longitudinal end. The main electric coil is disposed to magnetically energize the MR passageway. The valve is operatively connected to the MR passageway. The valve has a first state when electrically activated which is less restrictive of the MR passageway and has a second state when not electrically activated which is more restrictive of the MR passageway. The rod is attached to the MR piston.

A second expression of an embodiment of the invention is for a magnetorheological (MR) piston including first and second MR piston end plates, an MR piston core, an MR piston ring, a main electric coil, and an electromagnetic valve. The first and second MR piston end plates have corresponding first and second orifices. The MR piston core has a central longitudinal axis and is disposed longitudinally between and attached to the first and second MR piston end plates. The MR piston ring is attached to the first and second MR piston end plates and is radially spaced apart from the MR piston core creating a gap therebetween. The gap is in fluid communication with the first and second orifices to overall define an MR passageway. The main electric coil is disposed in the MR piston core to magnetically energize the gap of the MR passageway. The electromagnetic valve is operatively connected to the MR passageway. The electromagnetic valve has an electromagnetic-valve coil and a spring-loaded restrictor plate. The electromagnetic valve has a first state which magnetically attracts the spring-loaded restrictor plate toward the electromagnetic-valve coil when the electromagnetic-valve coil is electrically activated. The electromagnetic valve has a second state which releases the magnetically-attracted spring-loaded restrictor plate to partially, but not completely, restrict the MR passageway when the electromagnetic-valve coil is not electrically activated.

A third expression of an embodiment of the invention is for a magnetorheological (MR) damper system including first and second MR piston end plates, an MR piston core, an MR piston ring, a main electric coil, an electromagnetic valve, a rod, a controller, and first and second wires. The first and second MR piston end plates have corresponding first and second orifices. The MR piston core has a central longitudinal axis and is disposed longitudinally between and attached to the first and second MR piston end plates. The MR piston ring is attached to the first and second MR piston end plates and is radially spaced apart from the MR piston core creating a gap therebetween. The gap is in fluid communication with the first and second orifices to overall define an MR passageway. The main electric coil is disposed in the MR piston core to magnetically energize the gap of the MR passageway. The electromagnetic valve is operatively connected to the MR passageway. The electromagnetic valve has an electromagnetic-valve coil and a spring-loaded restrictor plate. The electromagnetic valve has a first state which magnetically attracts the spring-loaded restrictor plate toward the electromagnetic-valve coil when the electromagnetic-valve coil is electrically activated. The electromagnetic valve has a second state which releases the magnetically-attracted spring-loaded restrictor plate to partially, but not completely, restrict the MR passageway when the electromagnetic-valve coil is not electrically activated. The rod is attached to at least one of the first MR piston end plate and the MR piston core proximate the first MR piston end plate. The controller is operatively connectable to an electric power source. The first wire extends from the controller, through the rod, and to the main electric coil. The second wire extends from the controller, through the rod, and to the electromagnetic-valve coil.

Several benefits and advantages are derived from one or more or all of the expressions of the embodiment of the invention. In one vehicle suspension application, the controller monitors the proper operation of the controlled MR damper system at vehicle start-up and as the vehicle is in operation. Once the controller has confirmed system operation, power is sent to the electromagnetic-valve coil to attract the spring-loaded restriction plate to allow an unrestricted MR passageway under normal operation of the MR damper system. A disruption of electric power (from whatever cause) will terminate power to the electromagnetic-valve coil and cause the valve to restrict the MR passageway resulting in firm damping. Firm damping increases vehicle maneuverability at high vehicle speed. Compare this to what happens when electric power is disrupted to a conventional MR damper piston wherein such disruption results in loss of viscosity of the MR fluid and wherein such loss of viscosity means very low damping is provided. The conventional MR damper system has two options. One is to limit the vehicle's top speed. The other is to compromise ride isolation for firmer off-state tuning to provide adequate vehicle handling in the event of power disruption.

DETAILED DESCRIPTION

It is noted that like parts are numbered alike throughout the figures. Referring now to the drawings, FIGS. 1-5 show an embodiment of the present invention. A first expression of the embodiment of FIGS. 1-5 is for a magnetorheological (MR) piston assembly 10 including an MR piston 12 and a rod 14. The MR piston 12 includes a central longitudinal axis 16, first and second longitudinal ends 18 and 20, an MR passageway 22, a main electric coil 24, and a valve (such as, but not limited to an electromagnetic valve 26). The MR passageway 22 extends from the first longitudinal end 18 to the second longitudinal end 20. The main electric coil 24 is disposed to magnetically energize the MR passageway 22. The valve (e.g., 26) is operatively connected to the MR passageway 22. The valve (e.g., 26) has a first state when electrically activated which is less restrictive of the MR passageway 22 and has a second state when not electrically activated (from whatever cause) which is more restrictive of the MR passageway 22. The rod 14 is attached to the MR piston 12.

It is noted that an MR passageway is a magnetically energizable passageway. The main electric coil 24 is adapted to magnetically energize MR fluid in the MR passageway 22. It is also noted that a valve is any device having at least first and second states, wherein the second state is more restrictive of a fluid passageway than is the first state.

In one enablement of the first expression of the embodiment of FIGS. 1-5, the MR passageway 22 is an internal passageway of the MR piston 12. In a different enablement, not shown, the MR passageway is an external passageway of the MR piston wherein a gap between the circumferential surface of the MR piston and the surrounding damper cylinder defines at least a portion of the MR passageway.

In one implementation of the first expression of the embodiment of FIGS. 1-5, the valve (e.g., 26) in the first state (see FIG. 2) provides substantially no restriction of the MR passageway 22, and the valve (e.g., 26) in the second state (see FIG. 3) provides partial, but not complete, restriction of the MR passageway 22. In the same or a different implementation, the valve (e.g., 26) is a bi-state valve having only the first and second states. Other implementations are left to those skilled in the art.

In one application of the first expression of the embodiment of FIGS. 1-5, the rod 14 is attached to the MR piston 12 proximate the first longitudinal end 18, and the valve (e.g., 26) is disposed proximate the second longitudinal end 20. In one variation, not shown, a rod extends from each of the two longitudinal ends. In the same or a different variation, not shown, a valve is disposed proximate each of the two longitudinal ends.

Figure 1:
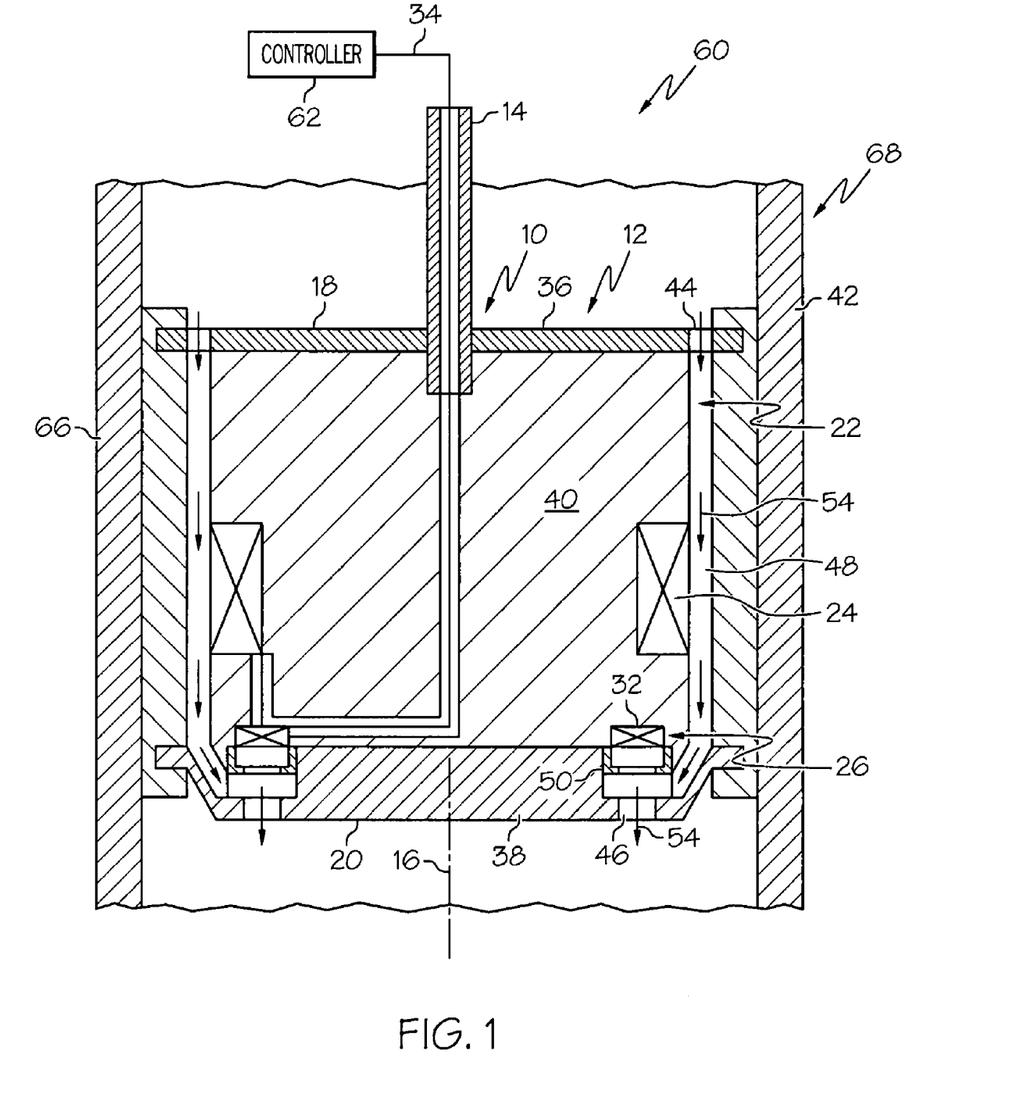
FIG. 1 is a schematic view of an embodiment of the invention showing an MR damper system including, in cross section, an MR piston, an MR piston assembly, and a portion of a damper cylinder and including, in block form, a controller and with a valve spring omitted for clarity.
Figure 2:
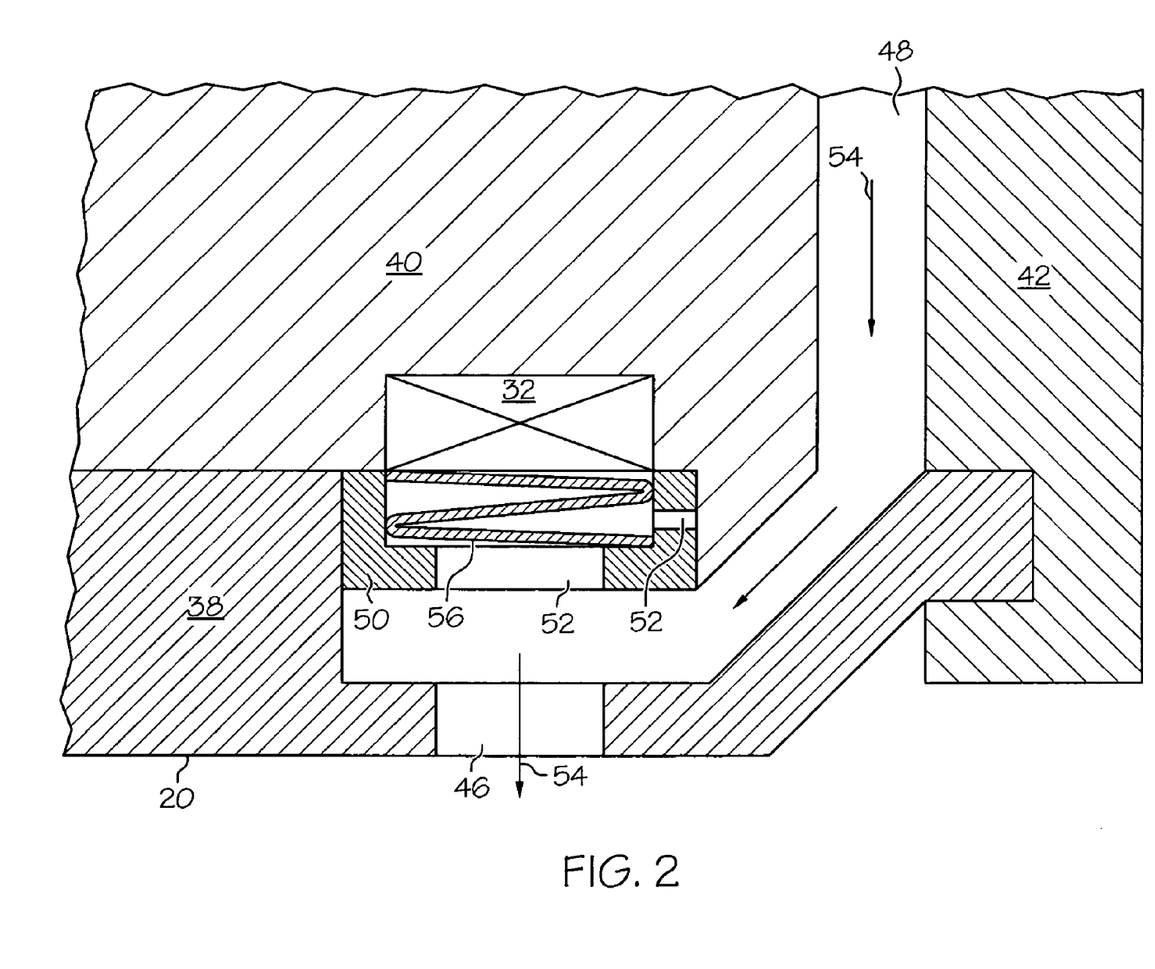
FIG. 2 is an enlarged view of a portion of FIG. 1 showing the electromagnetic valve in a first state which provides substantially no restriction of the MR passageway.
Figure 3:
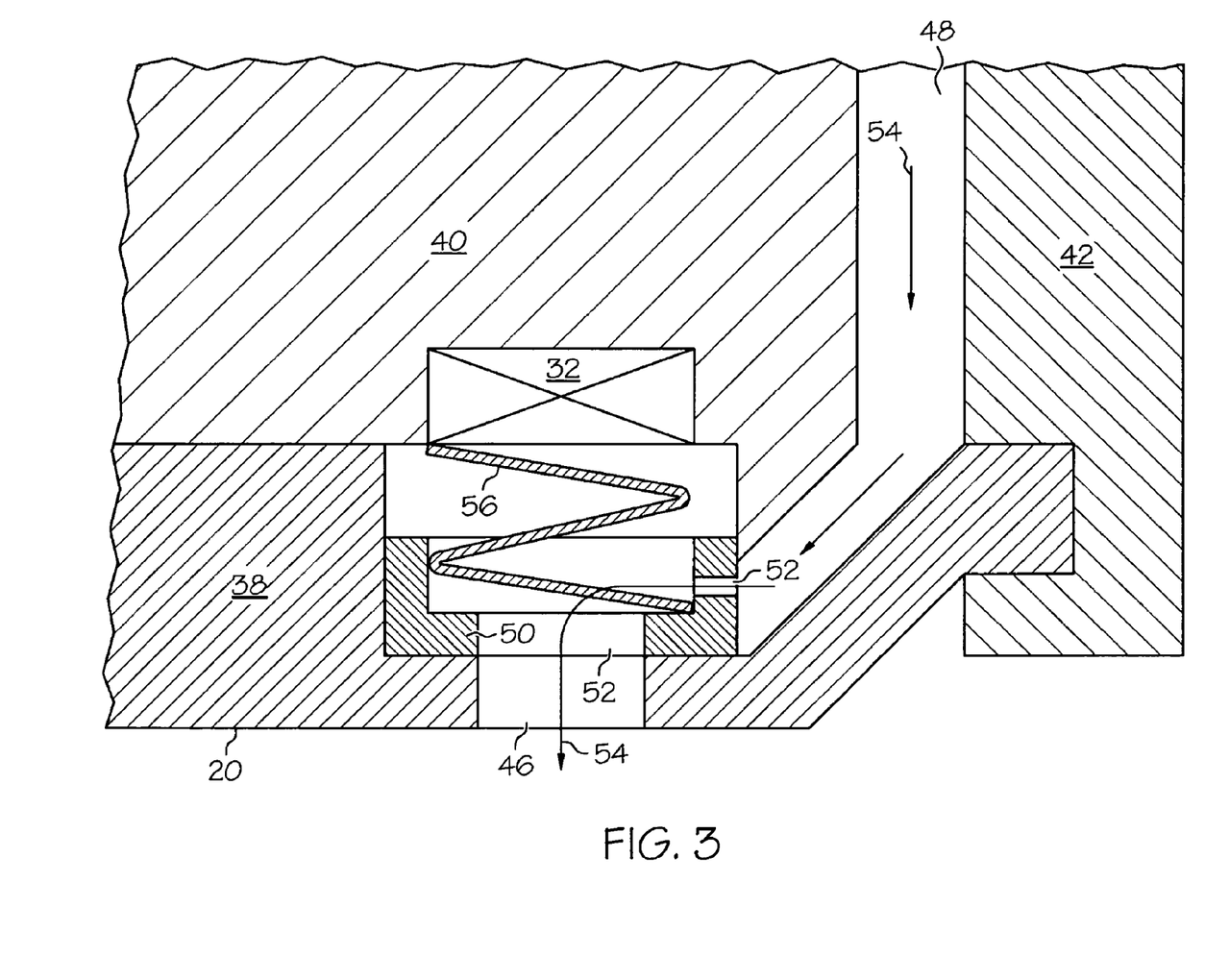
FIG. 3 is a view, as in FIG. 2, but showing the electromagnetic valve in a second state which provides partial, but not complete, restriction of the MR passageway.
Figure 4:
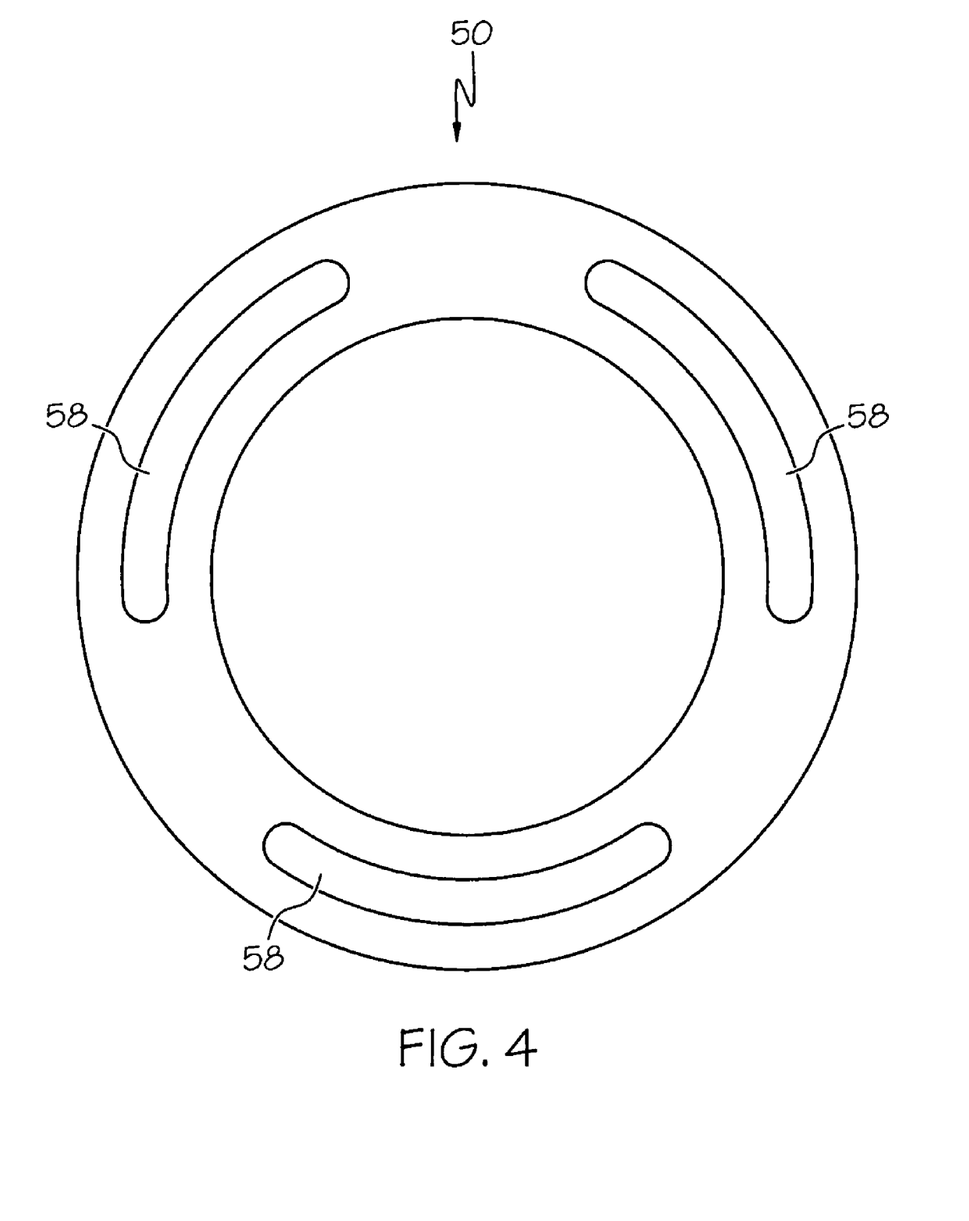
FIG. 4 is a bottom end view of the spring-loaded restriction plate of electromagnetic valve of FIG. 1 removed from the MR damper of FIG. 1 and without the spring.
Figure 5:
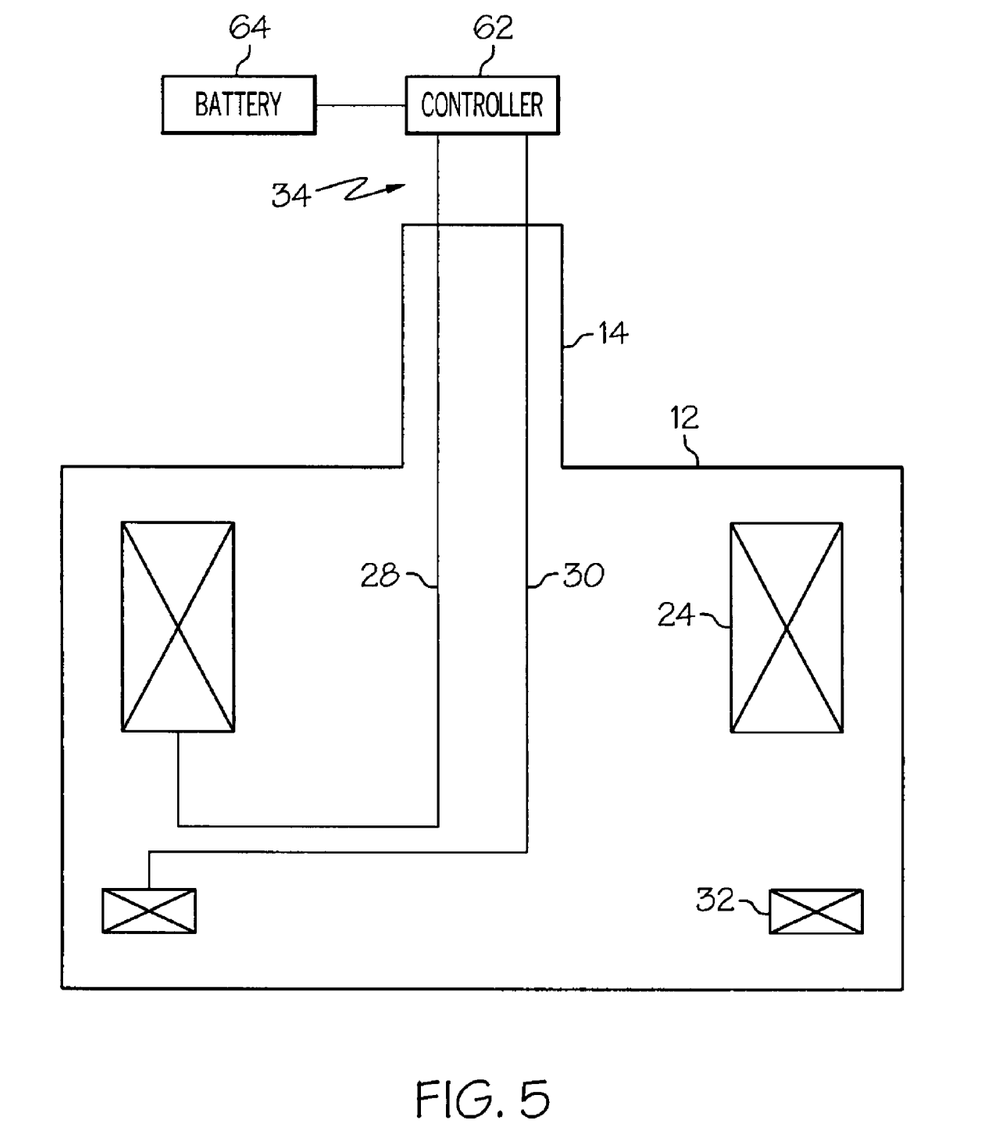
FIG. 5 is an explanatory wiring diagram showing: the controller of FIG. 1 operatively connected to an electric power source; a first wire extending from the controller, through the rod, and to the main electric coil of the MR piston of FIG. 1; and a second wire extending from the controller, through the rod, and to the electromagnetic-valve coil of the MR piston of FIG. 1.

In one arrangement of the first expression of the embodiment of FIGS. 1-5 and best seen in FIG. 5, the MR piston assembly 10 also includes a first wire 28 extending from within the rod 14 to the main electric coil 24 and a second wire 30 extending from within the rod 14 to the valve (such as to the electromagnetic-valve coil 32 of the electromagnetic valve 26). The first and second wires 28 and 30 together are referred to as a dual wire 34 which is schematically shown in FIG. 1. In one variation, the first and second wires 28 and 30, when electrically activated, each have a positive voltage. In one modification, the ground for the coils 24 and 32 is through the MR piston 12 and the rod 14. In a different modification, not shown, a third wire provides the ground for the coils and accompanies the first and second wires.

A second expression of the embodiment of FIGS. 1-5 is for a magnetorheological (MR) piston 12 including first and second MR piston end plates 36 and 38, an MR piston core 40, an MR piston ring 42, a main electric coil 24, and an electromagnetic valve 26. The first and second MR piston end plates 36 and 38 have corresponding first and second orifices 44 and 46. The MR piston core 40 has a central longitudinal axis 16 and is disposed longitudinally between and attached to the first and second MR piston end plates 36 and 38. The MR piston ring 42 is attached to the first and second MR piston end plates 36 and 38 and is radially spaced apart from the MR piston core 40 creating a gap 48 therebetween. The gap 48 is in fluid communication with the first and second orifices 44 and 46 to overall define an MR passageway 22. The main electric coil 24 is disposed in the MR piston core 40 to magnetically energize the gap 48 of the MR passageway 22. The electromagnetic valve 26 is operatively connected to the MR passageway 22. The electromagnetic valve 26 has an electromagnetic-valve coil 32 and a spring-loaded restrictor plate 50. The electromagnetic valve 26 has a first state which magnetically attracts the spring-loaded restrictor plate 50 toward the electromagnetic-valve coil 32 when the electromagnetic-valve coil 32 is electrically activated. The electromagnetic valve 26 has a second state which releases the magnetically-attracted spring-loaded restrictor plate 50 to partially, but not completely, restrict the MR passageway 22 when the electromagnetic-valve coil 32 is not electrically activated (from whatever cause).

In one enablement of the second expression of the embodiment of FIGS. 1-5, the electromagnetic-valve coil 32 is attached to the MR-piston core 40. In one variation, the spring-loaded restrictor plate 50 includes a restrictive channel 52 which is disposed out of fluid communication with the MR passageway 22 in the first state and which is disposed in fluid communication with the MR passageway 22 in the second state (to partially, but not completely, restrict the MR passageway 22). In one modification, the electromagnetic-valve coil 32 is substantially coaxially aligned with the central longitudinal axis 16. In one example, the spring-loaded restrictor plate 50 is annular and is substantially coaxially aligned with the central longitudinal axis 16. In one illustration, the spring-loaded restrictor plate 50 moves substantially parallel to the central longitudinal axis 16 when the electromagnetic valve 26 transitions between the first and second states (see FIGS. 2 and 3). In one configuration, the restrictive channel 52 bends an MR fluid flow 54 therein substantially ninety degrees. It is noted that the direction of the MR fluid flow 54 seen in FIGS. 2 and 3 indicates the MR piston 12 is in rebound.

In one construction of the second expression of the embodiment of FIGS. 1-5, the electromagnetic valve 26 includes a spring 56. The spring 56 provides the spring load for the spring-loaded restrictor plate 50. In one variation, the spring is a Belleville-washer type spring. Other spring designs are left to the artisan.

In one employment of the second expression of the embodiment of FIGS. 1-5, the spring-loaded restrictor plate 50 includes openings 58 which serve to equalize pressure. This prevents an MR fluid flow which is opposite in direction to the MR fluid flow 54 seen in FIGS. 2 and 3, such as would occur during when the MR piston 12 is in jounce, from pushing the spring-loaded restrictor plate 50 against the spring 56 and up toward the electromagnetic-valve coil 32.

A third expression of the embodiment of FIGS. 1-5 is for a magnetorheological (MR) damper system 60 and includes the MR piston 12, a controller 62, and first and second wires 28 and 30. The rod 14 is attached to at least one of the first MR piston end plate 36 and the MR piston core 40 proximate the first MR piston end plate 36. The controller 62 is operatively connectable to an electric power source (such as, but not limited to a battery 64). The first wire 28 extends from the controller 62, through the rod 14, and to the main electric coil 24. The second wire 30 extends from the controller 62, through the rod 14, and to the electromagnetic-valve coil 32.

In one deployment of the third expression of the embodiment of FIGS. 1-5, the electromagnetic valve 26 is attached to MR piston core 40 proximate the second MR piston end plate 38. It is noted that the variations, modifications, etc. of the second expression of the embodiment of FIGS. 1-5 are equally applicable to the third expression of the embodiment of FIGS. 1-5. In one extension, the MR damper system 60 includes a damper cylinder 66 (only a portion of which is shown in FIG. 1) surrounding the MR piston 12. It is noted that the MR damper system 60 minus the controller 62 may be referred to as the MR damper 68. In one embellishment, not shown, the MR piston 12 includes an MR bypass passageway radially inward of the MR passageway 12 and the main electric coil 24, wherein an MR bypass passageway is a magnetically non-energizable passageway.

Several benefits and advantages are derived from one or more or all of the expressions of the embodiment of the invention. In one vehicle suspension application, the controller monitors the proper operation of the controlled MR damper system at vehicle start-up and as the vehicle is in operation. Once the controller has confirmed system operation, power is sent to the electromagnetic-valve coil to attract the spring-loaded restriction plate to allow an unrestricted MR passageway under normal operation of the MR damper system. A disruption of electric power (from whatever cause) will terminate power to the electromagnetic-valve coil and cause the valve to restrict the MR passageway resulting in firm damping. Firm damping increases vehicle maneuverability at high vehicle speed. Compare this to what happens when electric power is disrupted to a conventional MR damper piston wherein such disruption results in loss of viscosity of the MR fluid and wherein such loss of viscosity means very low damping is provided. The conventional MR damper system has two options. One is to limit the vehicle's top speed. The other is to compromise ride isolation for firmer off-state tuning to provide adequate vehicle handling in the event of power disruption.

The foregoing description of several expressions of an embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

The invention claimed:

1. A magnetorheological (MR) piston (12) comprising:
   a) first and second MR piston end plates (36 and 38) having corresponding first and second orifices (44 and 46);
   b) an MR piston core (40) having a central longitudinal axis (16) and disposed longitudinally between and attached to the first and second MR piston end plates (36 and 38);
   c) an MR piston ring (42) attached to the first and second MR piston end plates (36 and 38) and radially spaced apart from the MR piston core (40) creating a gap (48) therebetween, wherein the gap (48) is in fluid communication with the first and second orifices (44 and 46) to overall define an MR passageway (22);
   d) a main electric coil (24) disposed in the MR piston core (40) to magnetically energize the gap (48) of the MR passageway (22); and
   e) an electromagnetic valve (26) operatively connected to the MR passageway (22), wherein the electromagnetic valve (26) has an electromagnetic-valve coil (32), a spring-loaded restrictor plate (50), a first state which magnetically attracts the spring-loaded restrictor plate (50) toward the electromagnetic-valve coil (32) when the electromagnetic-valve coil (32) is electrically activated, and a second state which releases the magnetically-attracted spring-loaded restrictor plate (50) to partially, but not completely, restrict the MR passageway (22) when the electromagnetic-valve coil (32) is not electrically activated.

2. The MR piston (12) of claim 1, wherein the electromagnetic-valve coil (32) is attached to the MR piston core (40).

3. The MR piston (12) of claim 2, wherein the spring-loaded restrictor plate (50) includes a restrictive channel (52) which is disposed out of fluid communication with the MR passageway (22) in the first state and which is disposed in fluid communication with the MR passageway (22) in the second state.

4. The MR piston (12) of claim 3, wherein the electromagnetic-valve coil (32) is substantially coaxially aligned with the central longitudinal axis (16).

5. The MR piston (12) of claim 4, wherein the spring-loaded restrictor plate (50) is annular and substantially coaxially aligned with the central longitudinal axis (16).

6. The MR piston (12) of claim 5, wherein the spring-loaded restrictor plate (50) moves substantially parallel to the central longitudinal axis (16) when the electromagnetic valve (26) transitions between the first and second states.

7. The MR piston (12) of claim 6, wherein the restrictive channel (52) bends an MR fluid flow (54) therein substantially ninety degrees.

8. A magnetorheological (MR) damper system (60) comprising:
   a) first and second MR piston end plates (36 and 38) having corresponding first and second orifices (44 and 46);
   b) an MR piston core (40) having a central longitudinal axis (16) and disposed longitudinally between and attached to the first and second MR piston end plates (36 and 38);
   c) an MR piston ring (42) attached to the first and second MR piston end plates (36 and 38) and radially spaced apart from the MR piston core (40) creating a gap (48) therebetween, wherein the gap (48) is in fluid communication with the first and second orifices (44 and 46) to overall define an MR passageway (22);
   d) a main electric coil (24) disposed in the MR piston core (40) to magnetically energize the gap (48) of the MR passageway (22);
   e) an electromagnetic valve (26) operatively connected to the MR passageway (22), wherein the electromagnetic valve (26) has an electromagnetic-valve coil (32), a spring-loaded restrictor plate (50), a first state which magnetically attracts the spring-loaded restrictor plate (50) toward the electromagnetic-valve coil (32) when the electromagnetic-valve coil (32) is electrically activated, and a second state which releases the magnetically-attracted spring-loaded restrictor plate (50) to partially, but not completely, restrict the MR passageway (22) when the electromagnetic-valve coil (32) is not electrically activated;
   f) a rod (14) attached to at least one of the first MR piston end plate (36) and the MR piston core (40) proximate the first MR piston end plate (36);
   g) a controller (62) operatively connectable to an electric power source (64);
   h) a first wire (28) extending from the controller (62), through the rod (14), and to the main electric coil (24); and
   i) a second wire (30) extending from the controller (62), through the rod (14), and to the electromagnetic-valve coil (32).

9. The MR damper system (60) of claim 8, wherein the electromagnetic valve (26) is attached to the MR piston core (40) proximate the second MR piston end plate (38).

10. The MR damper system (60) of claim 9, wherein the spring-loaded restrictor plate (50) includes a restrictive channel (52) which is disposed out of fluid communication with the MR passageway (22) in the first state and which is disposed in fluid communication with the MR passageway (22) in the second state.

11. The MR damper system (60) of claim 10, wherein the electromagnetic-valve coil (32) is substantially coaxially aligned with the central longitudinal axis (16), and wherein the spring-loaded restrictor plate (50) is annular and substantially coaxially aligned with the central longitudinal axis (16).

12. The MR damper system (60) of claim 11, wherein the spring-loaded restrictor plate (50) moves substantially parallel to the central longitudinal axis (16) when the electromagnetic valve (26) transitions between the first and second states.

13. The MR damper system (60) of claim 12, wherein the restrictive channel (52) bends an MR fluid flow (54) therein substantially ninety degrees.

14. A magnetorheological piston assembly (10) comprising:
   a piston (12) extending a longitudinal axis (16) between first and second longitudinal ends (18 and 20) and defining an passageway (22) extending between said first and second longitudinal ends (18 and 20) for conveying an MR fluid therebetween,
   a main electric coil (24) for magnetically energizing the MR fluid in said passageway (22),
   an electromagnetic valve (26) operatively connected to said passageway (22) including a resistor plate (50) moveable between a first state for allowing the MR fluid to unobstructedly flow through said passageway (22) and a second state for restricting the flow of the MR fluid through said passageway (22), and
   said electromagnetic valve (26) further including an electromagnetic valve coil (32) for imparting a magnetic force on said resistor plate (50) to move said resistor plate (50) between said first and second states.

15. The assembly (10) as set forth in claim 14 further including a spring (56) engaging said resistor plate (50) for biasing said resistor plate (50) to one of said first and second states.

16. The assembly (10) as set forth in claim 14 wherein said resistor plate (50) defines a restrictive channel (52) which is disposed out of fluid communication with said passageway (22) in said first state and which is disposed in fluid communication with said passageway (22) in said second state.

17. The assembly (10) as set forth in claim 14 further including a rod (14) attached to said piston.

18. The assembly (10) as set forth in claim 17 further including a controller (62) and a first wire (28) extending from said controller (62) through said rod (14) to said main electric coil (24).

19. The assembly (10) as set forth in claim 18 further including a second wire (30) extending from said controller (62) through said rod (14) to said electromagnetic-valve coil (32).

20. The assembly (10) as set forth in claim 14 wherein said piston (12) defines a piston core (40) and includes a piston ring (42) radially spaced from said piston core (40) to define said passageway (22) between said piston core (40) and said piston ring (42).

* * * * *

UNITED STATES PATENT AND TRADEMARK OFFICE
CERTIFICATE OF CORRECTION

| | | |
|---|---|---|
| PATENT NO. | : 7,828,126 B2 | |
| APPLICATION NO. | : 11/900825 | |
| DATED | : November 9, 2010 | |
| INVENTOR(S) | : Saiman Lun | |

It is certified that error appears in the above-identified patent and that said Letters Patent is hereby corrected as shown below:

Column 5, Line 39 "MR piston 12, a controller 62" should read -- MR piston 12, a rod 14, a controller 62 --.

Signed and Sealed this
First Day of February, 2011

David J. Kappos
*Director of the United States Patent and Trademark Office*